June 13, 1961     H. W. MARSHALL, JR     2,987,958
OPTICAL SLIT MECHANISM
Filed July 19, 1957     3 Sheets-Sheet 1
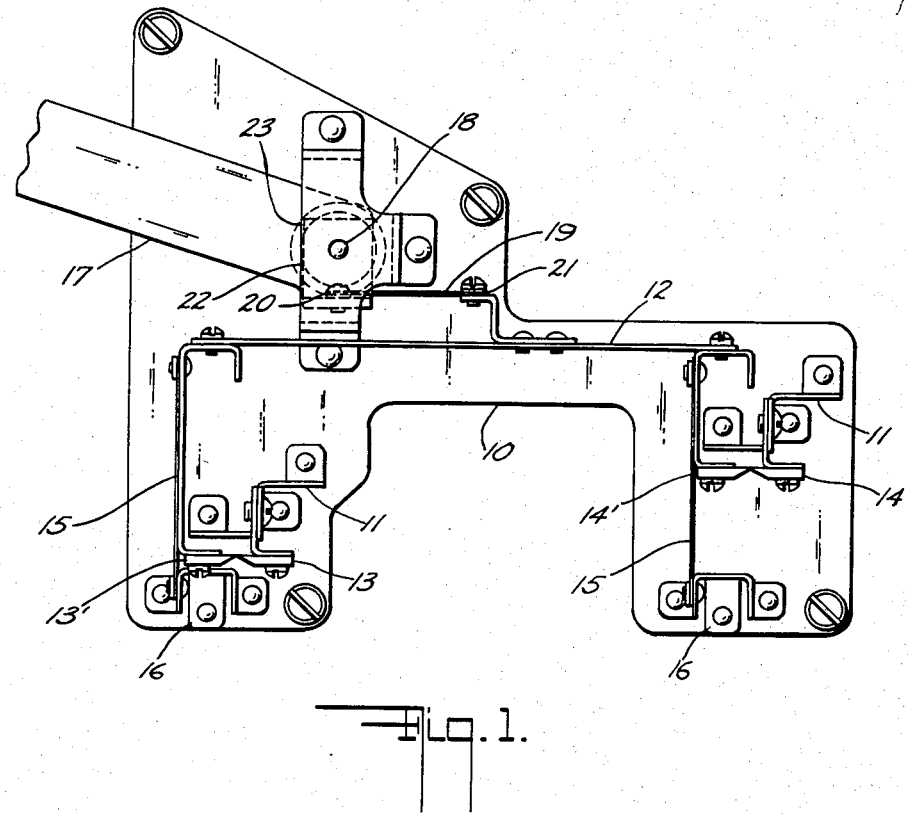
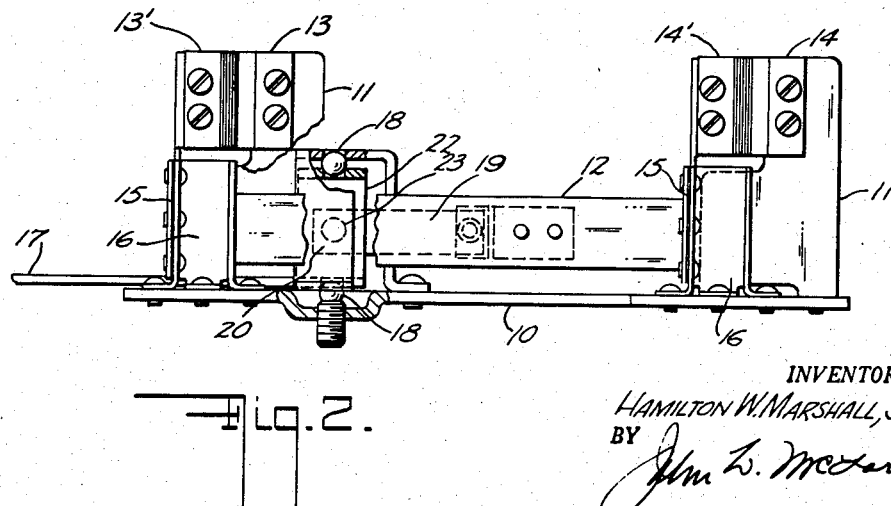
INVENTOR.
HAMILTON W. MARSHALL, JR.
BY
ATTORNEY June 13, 1961   H. W. MARSHALL, JR   2,987,958
OPTICAL SLIT MECHANISM
Filed July 19, 1957   3 Sheets-Sheet 2
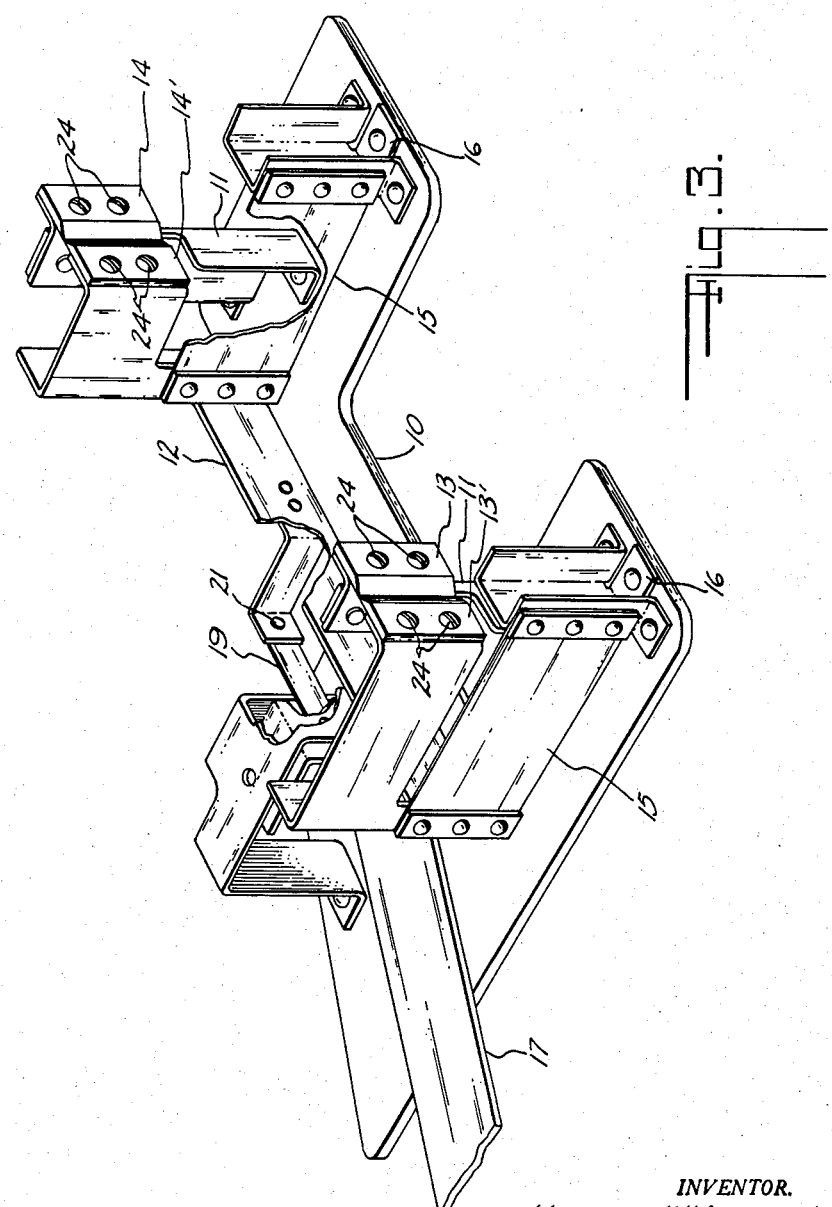
INVENTOR.
HAMILTON W. MARSHALL, JR.
BY
ATTORNEY

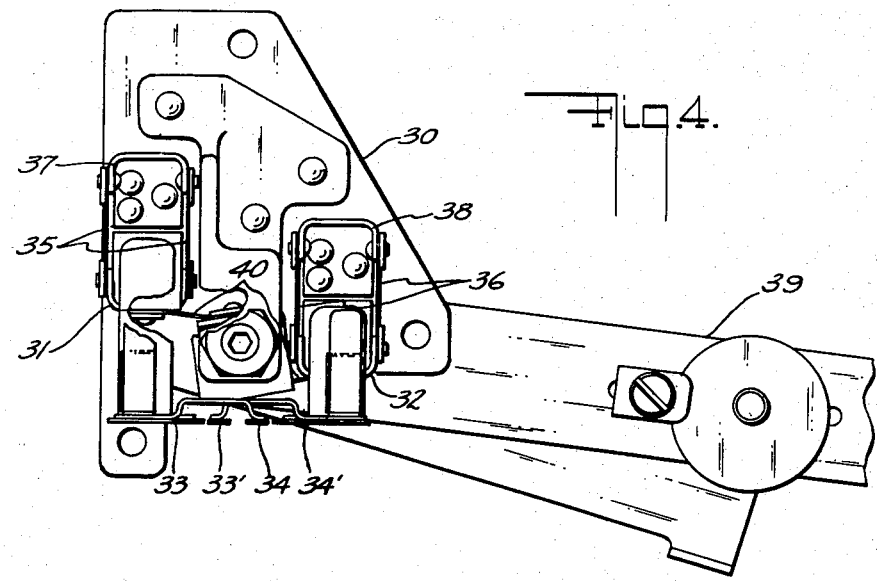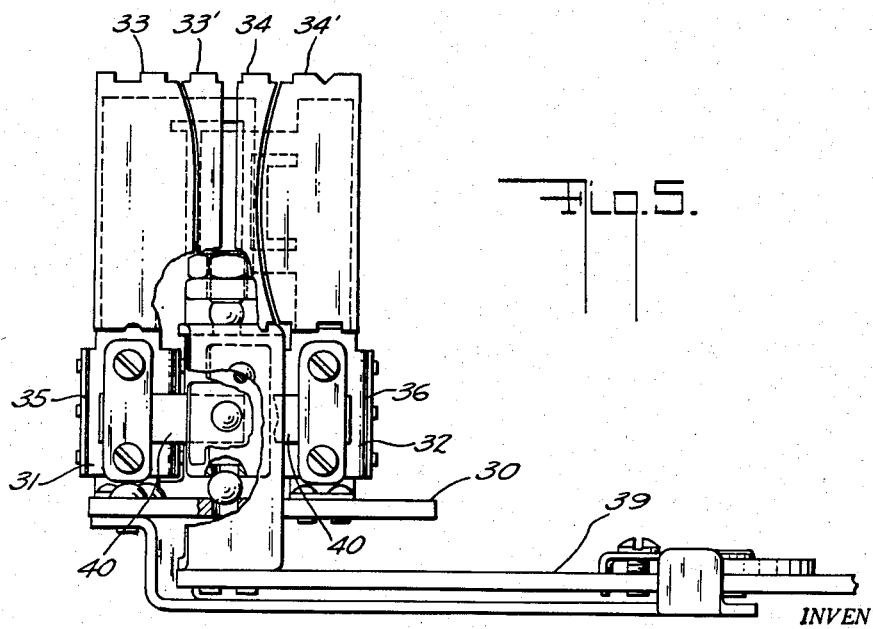

United States Patent Office 2,987,958
Patented June 13, 1961

2,987,958
OPTICAL SLIT MECHANISM
Hamilton W. Marshall, Jr., East Norwalk, Conn., assignor to The Perkin-Elmer Corporation, Norwalk, Conn., a corporation of New York
Filed July 19, 1957, Ser. No. 673,088
4 Claims. (Cl. 88—61)

The present invention is concerned with a mechanism for adjusting the effective width of optical slits. More particularly, it relates to a device which affords convenient, accurate and reliable simultaneous adjustment of multiple optical slit arrangements.

Optical slits are usually defined by a pair of opaque slit jaws arranged and aligned so as to perform the particular optical function for which they were designed. A typical conventional method of adjustably mounting such optical jaws involves supporting each jaw on a separate member rotatable about a common axis. The rotatable members are customarily linked to control means so that the width of the optical slit between the jaws may be varied as desired. Obviously, the adjustment of such rotatable members is not a linear movement in a single plane but, rather, undesirable rotation of each jaw through an arc of movement.

Further, slit jaws which are mounted so as to be adjustable by means of simultaneous rotation about a common axis necessarily cause a displacement of the effective optical slit by an amount related to the arc which the edges of the slit jaws subtend when so opened as compared to the shorter arc subtended when they are brought closer together. In optical instruments of a highly accurate kind, such displacement may be a source of error and it may be much more desirable that matched slit jaws define the optical slit by movement in a substantially single plane toward or away from each other for adjusting the optically effective width of the slit as desired.

Additionally, there is the problem of insuring synchronous operation of the rotatable members of such prior art arrangements so the multiple slit systems function in precise unison.

The prime object of the present invention is, therefore, to devise a multiple optical slit mechanism which essentially eliminates movement of each slit along the light axis while adjusting the width thereof.

An ancillary object of the present invention is to devise an optical slit mechanism which provides simple operation without sacrifice of optical accuracy and lends itself to inexpensive manufacture.

The present invention provides a means for optically adjusting multiple slits so that the matched slit jaws of each pair are laterally translated in a substantially common plane regardless of the adjustment or variation of the slit width. The present invention also insures that multiple slit arrangements operate in precise synchronism without backlash or play.

Moreover, the present invention readily lends itself to an arrangement of multiple optical slits wherein one slit jaw of a matched pair may be supported in a fixed position while the other jaw of the same matched pair is adjustably movable.

The present invention is so conceived that it may readily be executed by manufacturing methods and means which are significantly less expensive than the techniques customarily employed in the art to manufacture optical slits of comparable accuracy.

An understanding and appreciation of the advantages and features of the present invention may be best had from the description of the construction and operation of several embodiments as illustrated in the accompanying drawings, in which:

FIG. 1 is a top view of a typical embodiment of the present invention;

FIG. 2 is a side elevation view of the embodiment of FIG. 1;

FIG. 3 is a perspective view of the embodiment of FIGS. 1 and 2;

FIG. 4 is a top view of another embodiment of the present invention; and

FIG. 5 is a side elevation view of the embodiment of FIG. 4.

As may be seen from FIGS. 1 and 2, the present invention is comprised of a base 10 and two sections 11 and section 12 which are affixed thereto. Two pairs of adjustable slit jaws 13, 13' and 14, 14' are mounted on the said sections, one jaw of each pair, 13 and 14, being affixed to a respective section 11 and the other jaw of each pair 13' and 14' being affixed to the other section 12.

Some aspects of the present invention may be more readily appreciated from the perspective view of FIG. 3 and to facilitate its being readily understood like parts of FIGS. 1, 2, and 3 bear the same numerical designation.

In accordance with the teaching of the present invention, at least one section of the optical slit mechanism is resiliently mounted so as to be adjustable in essentially a single degree of movement. This is accomplished in the embodiment of FIGS. 1, 2, and 3 by mounting one section 12 by means of flat plates of spring steel 15 which are in turn supported by brackets 16 on the base 10. The section 12, thus resiliently supported, is rendered movable substantially in a single plane so that the jaws 13' and 14', affixed thereto may be moved away from or toward the other two matching slit jaws 13 and 14.

Since an optical slit is defined by a space between each pair of slit jaws, the adjustment of the movable jaws 13' and 14' of the embodiment of FIGS 1, 2, and 3 determines the width of the optical slits. This slit adjustment is accomplished simultaneously and in unison, one slit jaw of each pair, 13 and 14, being supported in fixed relation to the base 10, and the remaining jaw of each pair, 13' and 14', being supported by the resilient member or section 12 of the assembly. The flat spring steel plates 15 afford easy lateral positioning of the movable slit jaws 13' and 14' but, at the same time, insure rigid support against any angular displacement of the slit jaws.

The positioning of the movable jaws 13' and 14' may be accurately and conveniently accomplished by a pivotable means such as a lever arm 17, operably connected through appropriate linkage to the resiliently mounted section 12 of the optical slit mechanism. Such a lever arm, as is shown at 17 in FIGS. 1, 2, and 3, may be mounted on ball bearings 18 and connected to the movable section 12 of the optical slit mechanism by means of a strip of spring steel 19. The spring steel linkage means 19 is affixed at one end 20 to a peripheral point of the arc through which the adjusting mechanism moves in response to adjustment of the pivotably mounted adjusting member 17.

Since optical slits of the kind contemplated by the present invention are customarily limited in their maximum open position to a small fraction of an inch, the flexible linkage means 19 in the form of a strip of spring steel, when arranged as shown in FIGS. 1 and 2, provides an adequate range of adjustment of the optical slits defined by the two pairs of slit jaws, 13 and 13', and 14 and 14'. If a wider adjustment is desired, the spring steel linkage means 19 may be wrapped partly around the cylindrical portion 22 of the pivotable adjusting member 17 and affixed at a point such as that at 23 to provide a maximum slit width opening commensurate with the linear length of the arc encompassed by that portion of the spring steel linkage 19 which is wrapped around the pivotable member 17. This latter suggested manner of linking the pivotable adjusting means 17 with the resiliently mounted section 12 of the optical slit mechanism also has the advantage that adjustment of the lever arm 17 would be translated linearly to the movable section 12 of the optical slit mechanism.

In the arrangement as shown in FIGS. 1, 2, and 3, it will be apparent that adjustment of the lever arm 17 to the extremities of its range of movement will cause some slight bending of the spring steel linkage means 19 introducing a slight deviation from linearity in the adjustment which is transmitted to the slit jaws. However, since the range of optical slit adjustment is usually relatively quite small, a small amount of nonlinearity is tolerable and, moreover, can be compensated for by appropriate design of the cam or other like means which is usually employed to position the lever arm 17 of the optical slit mechanism.

FIG. 3 is a perspective view of the embodiment shown in the plan view and side elevation in FIGS. 1 and 2 respectively. The actual operation of the optical slit mechanism constructed in accordance with the present invention may be better appreciated from the perspective view of FIG. 3. Like parts of the optical slit mechanism bear the same numerical designation as in FIGS. 1 and 2. As perhaps is best seen in FIG. 3, the two pairs of slit jaws 13 and 13', 14 and 14', are seen to be mounted at the same height but in different planes. This particular embodiment of the present invention was designed to operate as entrance and exit slits in an optical system which required that the slits be positioned in two different planes.

It will be apparent to one skilled in the art that the present invention may be advantageously employed in a number of specifically different ways where several pairs of slit jaws are mounted at different heights or in different planes as may be required by the particular optical system for which they are designed and the particular function which the optical slits are required to accomplish. The individual jaws 13 and 13', 14 and 14' of the optical slit mechanism as illustrated in the embodiment of FIGS. 1, 2, and 3 are ground and shaped to a chisel-like configuration and each jaw is separately attached to one section of the optical slit mechanism by means of screws 24. Such jaws, after being formed, must be affixed to the optical slit mechanism on which they are to operate and then optically aligned to insure that they precisely define the desirable optical slits.

In accordance with the teaching of copending application Serial No. 673,089, filed July 19, 1957, by E. Horace Siegler, Jr., optical slits may be manufactured by a novel method which makes it possible to affix the slit jaws to the optical slit mechanism in pre-alignment, requiring no additional adjustment or alignment after having been so mounted. The embodiment shown in FIGS. 4 and 5 illustrates this type of slit jaws 33 and 33', 34 and 34'. As illustrated in FIGS. 4 and 5, this particular embodiment is comprised of a fixed base 30 and two sections 31 and 32 which are affixed thereto, both sections being resiliently mounted. The first resiliently mounted section 31 supports one slit jaw of each pair of slit jaws, 33 and 34, and the second flexibly mounted section 32 of the mechanism supports the other slit jaw of each pair.

The emobdiment of FIGS. 4 and 5 is so designed and arranged that the two optical slits defined by the two pairs of slit jaws 33 and 33', 34 and 34' are adjustable and operative in essentially a single plane. The matched jaws of each optical slit move simultaneously with respect to each other and by an equal amount so that a comparatively very rapid adjustment of the slit width openings may be achieved. The first and second sections 31 and 32 of the optical slit mechanism illustrated in FIGS. 4 and 5 may be rendered resiliently adjustable within a substantially single degree of movement by being supported on spring means such as the flat plates of spring steel 35 and 36 as shown in FIG. 4. The spring steel plates 35 and 36 are affixed at one end to brackets 37 and 38, respectively, on the base 30 and at their opposite ends to the first and second sections 31 and 32, respectively, upon which the slit jaws are mounted.

As previously explained, the first and second sections 31 and 32 of the slit mechanism illustrated in the embodiment of FIGS. 4 and 5 are arranged to be movable in unison. These first and second movable sections 31 and 32 are sometimes called "shuttles" in the optical arts. A pivotable member 39 is mounted on the fixed base 30 and linkage means 40 operatively connects it to each of the movable sections or shuttles 31 and 32. Thus, when the pivotable member 39 is moved about its axis of rotation, the adjustable sections or shuttles 31 and 32 are displaced away from each other or toward each other in accordance with the sense in which the pivotable member 39 is positioned. The adjustment of the pivotable member 39 determines the effective optical widths of the multiple slits.

The slit adjusting mechanism comprises essentially two similar parallelograms. One of these parallelograms comprises bracket 37, section 31, and spring steel plates 35. The other parallelogram comprises similar elements 38, 32, and 36. Bracket 31 supports slit jaws 33 and 34. Bracket 32 supports slit jaws 33' and 34'. A rotating cylindrical member is located intermediate the two parallelograms, rotates on the ball bearings shown in FIG. 5, and is operated by the movement of lever arm 39. A flexible linkage 40 is connected between bracket 31 and one side of the rotating member. A similar linkage 40 (shown broken away in FIG. 5) is connected between bracket 32 and the opposite side of the rotating member. Movement of lever arm 39 causes rotation of the rotating element and causes linkages 40 to move in opposite directions. Each parallelogram is thus caused to deform in a different direction and the slits are opened or closed. As the parallelograms are adjusted simultaneously, the slit jaws are displaced along the axis of the transmitted light by small but equal amounts. The slit opening thus remains perpendicular to the light axis.

The shuttles 31 and 32 upon which the slit jaws 33, 33', 34, and 34' are mounted (usually by an appropriate bonding method, such as it taught in copending application Serial No. 673,089, filed July 19, 1957, by E. Horace Siegler, Jr.) are so designed and shaped that a shuttle, as shown at 31, supports one slit jaw of each pair of slit jaws, 33 and 34, while the remaining shuttle 32 supports the other slit jaw of each pair of slit jaws, 33' and 34'. Thus, all the slit jaws 33, 33', 34 and 34', of the particular embodiment illustrated in FIGS. 4 and 5 are resiliently mounted to be adjusted simultaneously and in the same sense, i.e., both optical slits are opened and closed together.

The arrangement of the present invention as illustrated in the embodiment of FIGS. 4 and 5 employs, for each section of the optical slit mechanism, two pieces of flat spring steel to support each section from the base. The support 37 which is affixed to and integral with the base 30 has attached to it two flat plates of spring steel 35 which are in turn connected at their opposite ends to the movable section or shuttle 31. Similarly, the support 38, mounted in fixed relation to the base 30, has attached to it two flat plates of spring steel 36 which are connected at their opposite ends to the movable shuttles 31 and 32. The mounting arrangement exemplified by the embodiment of FIGS. 4 and 5 is therefore one in which the resilient movement of the shuttles 31 and 32 results from a substantially parallelogram mounting configuration arranged so that two parallel sides of each parallelogram may be flexibly displaced. The lateral movement of the shuttles 31 and 32 (and the respective slit jaws 33 and 34, 33' and 34' mounted thereon) provides substantially planar displacement. This arrangement prevents any significant displacement of the optical slits forward or back with respect to the optical path in which they are operating. The slits of the present invention may therefore be positioned and readily maintained within the focal depth of the optical system in which they are employed.

From the foregoing description of several embodiments of the present invention and the exposition of the principles upon which it has been conceived and executed, it will be apparent that an optical slit mechanism may be fabricated and constructed in accordance with the teaching of the present invention without resort to relatively expensive, high precision components which must be individually machined. The present invention, because of its simple construction and inherent reliability of operation, may be manufactured of mass-produced sheet metal parts to a great extent. Elaborate and expensive gearing arrangements are eliminated by the present invention, together with the problems of play and backlash which are usually attendant upon gear-driven adjustable optical slits. Though the two embodiments illustrated, disclosed, and explained herein are typical of the present invention, it is apparent that the principles of construction and operation of the present invention may be embodied in numerous different forms of adjustable optical slit devices.

The term "plane of motion" as used in the appended claims may be defined as that plane through which a given point on an element travels upon movement of that element.

Since many changes could be made in the specific combinations of apparatus disclosed herein and many apparently different embodiments of this invention could be made without departing from the scope thereof, it is intended that all matter contained in the foregoing description or shown in the accompanying drawings shall be interpreted as being illustrative and not in a limiting sense.

I claim:

1. A multiple optical slit mechanism wherein each optical slit is defined by a pair of adjustably mounted slit jaws, comprising a base having affixed thereto first and second parallel plates resiliently arcuately movable in a plane normal to their principal planes, said first plate fixedly supporting a first slit jaw of each pair and said second plate fixedly supporting a second slit jaw of each pair, said first and second jaws defining a slit lying in a plane perpendicular to the plane of motion of said plates, a pivotable member mounted on said base equidistant from said plates, and linkage means connecting said pivotable member with said plates, whereby the pivotal position of said member resiliently adjusts the width of said optical slit.

2. A multiple optical slit mechanism wherein each optical slit is defined by a pair of adjustably mounted slit jaws, comprising a base having affixed thereto first and second parallel plates resiliently arcuately movable in a plane normal to their principal planes, said first plate fixedly supporting a first corresponding slit jaw of each pair and said second plate fixedly supporting a second corresponding slit jaw of each pair, said first and second jaws defining a slit lying in a plane perpendicular to the plane of motion of said plates, a pivotable member mounted on said base, and linkage means connecting said pivotable member with said plates for urging said plates in opposite directions in response to the positioning of said pivotable member, whereby to resiliently adjust the width of said optical slits.

3. An optical slit mechanism comprising a base member; a plurality of blade-like resilient supporting members having their major surfaces parallel to one another, one end of each supporting member being fixedly attached to said base member; connecting means between the supporting members to maintain said supporting members in spaced relationship to one another; first slit jaw means mounted on the structure formed by said connecting means and said supporting members; second slit jaw means rigidly mounted on said base in optical alignment with said first slit jaw means to form an optical slit therewith; and means for flexing said resilient members to move said structure relative to said base member to vary the width of the optical slit.

4. An optical slit adjusting mechanism having a plurality of optical slits, each slit being defined by a pair of parallel matched slit jaws supported on an adjustable mount, said mount comprising a base member, first resilient blade-like supporting means mounted on said base and having thereon a plurality of slit jaw means defining one side of each of said slits, second resilient blade-like supporting means mounted on said base and having thereon a plurality of slit jaw means defining the other side of each of said slits, each of the slits defined by said jaws lying in a plane perpendicular to the plane of motion of said supporting means, said first and second supporting means having their major surfaces parallel to one another, rotatable member means intermediate said first and second supporting means, flexible linkage means connecting each of said supporting means to opposite peripheral portions of said rotatable member means, and means operably connected to rotate said rotatable member whereby said supporting means are flexed and each of the slits defined by said jaws is simultaneously adjusted in width.

References Cited in the file of this patent

UNITED STATES PATENTS

| | | |
|---|---|---|
| 2,227,510 | Pineo | Jan. 7, 1941 |
| 2,312,010 | Van Den Akker | Feb. 23, 1943 |
| 2,408,512 | Gradisar | Oct. 1, 1946 |
| 2,587,451 | Farrand | Feb. 26, 1952 |
| 2,669,899 | Macleish | Feb. 23, 1954 |
| 2,705,440 | George et al. | Apr. 5, 1955 |
| 2,795,170 | Hansen et al. | June 11, 1957 |

FOREIGN PATENTS

| | | |
|---|---|---|
| 774,842 | Great Britain | May 15, 1957 |